United States Patent
Dods

(10) Patent No.: US 11,902,330 B1
(45) Date of Patent: Feb. 13, 2024

(54) GENERATING A NETWORK SECURITY POLICY BASED ON A USER IDENTITY ASSOCIATED WITH MALICIOUS BEHAVIOR

(71) Applicant: Juniper Networks, Inc., Sunnyvale, CA (US)

(72) Inventor: Craig Dods, Stittsville (CA)

(73) Assignee: Juniper Networks, Inc., Sunnyvale, CA (US)

( * ) Notice: Subject to any disclaimer, the term of this patent is extended or adjusted under 35 U.S.C. 154(b) by 231 days.

(21) Appl. No.: 17/304,200

(22) Filed: Jun. 16, 2021

(51) Int. Cl.
  *H04L 9/40* (2022.01)

(52) U.S. Cl.
  CPC .......... *H04L 63/20* (2013.01); *H04L 63/101* (2013.01); *H04L 63/102* (2013.01); *H04L 2463/146* (2013.01)

(58) Field of Classification Search
  CPC ...... H04L 63/20; H04L 63/101; H04L 63/102
  See application file for complete search history.

(56) References Cited

U.S. PATENT DOCUMENTS

| | | | |
|---|---|---|---|
| 8,615,785 B2 | 12/2013 | Elrod et al. | |
| 10,158,675 B2* | 12/2018 | Graham | H04L 63/1416 |
| 11,457,042 B1* | 9/2022 | Vakili | H04L 63/102 |
| 2013/0197998 A1* | 8/2013 | Buhrmann | H04M 1/27 726/3 |
| 2014/0304765 A1 | 10/2014 | Nakamoto et al. | |
| 2016/0269430 A1* | 9/2016 | Laswell | H04L 63/0245 |
| 2018/0041537 A1* | 2/2018 | Bloxham | H04L 63/0263 |
| 2018/0234442 A1* | 8/2018 | Luo | G06N 7/01 |
| 2019/0052659 A1* | 2/2019 | Weingarten | H04L 41/16 |
| 2019/0312887 A1* | 10/2019 | Grimm | H04L 63/145 |
| 2019/0380037 A1* | 12/2019 | Lifshitz | G06N 20/20 |
| 2020/0120408 A1 | 4/2020 | Boyd et al. | |
| 2021/0234860 A1* | 7/2021 | Bansal | H04W 12/37 |
| 2021/0266346 A1* | 8/2021 | Gordon | H04L 63/0245 |
| 2022/0109696 A1* | 4/2022 | Deshmukh | H04L 43/045 |

* cited by examiner

*Primary Examiner* — Matthew Smithers
*Assistant Examiner* — Shu Chun Gao
(74) *Attorney, Agent, or Firm* — Harrity & Harrity, LLP

(57) ABSTRACT

A device may receive data identifying malicious behavior by a compromised endpoint device associated with a network and may receive user identity data identifying a user of the compromised endpoint device associated with the network. The device may receive endpoint device data identifying the compromised endpoint device and other endpoint devices associated with the network and may receive network device data identifying network devices associated with the network. The device may utilize the data identifying malicious behavior, the user identity data, and the endpoint device data to generate, based on an identity of the user, a security policy to isolate the malicious behavior. The device may cause the security policy to be provided to the network devices and the other endpoint devices based on the network device data and the endpoint device data.

20 Claims, 9 Drawing Sheets

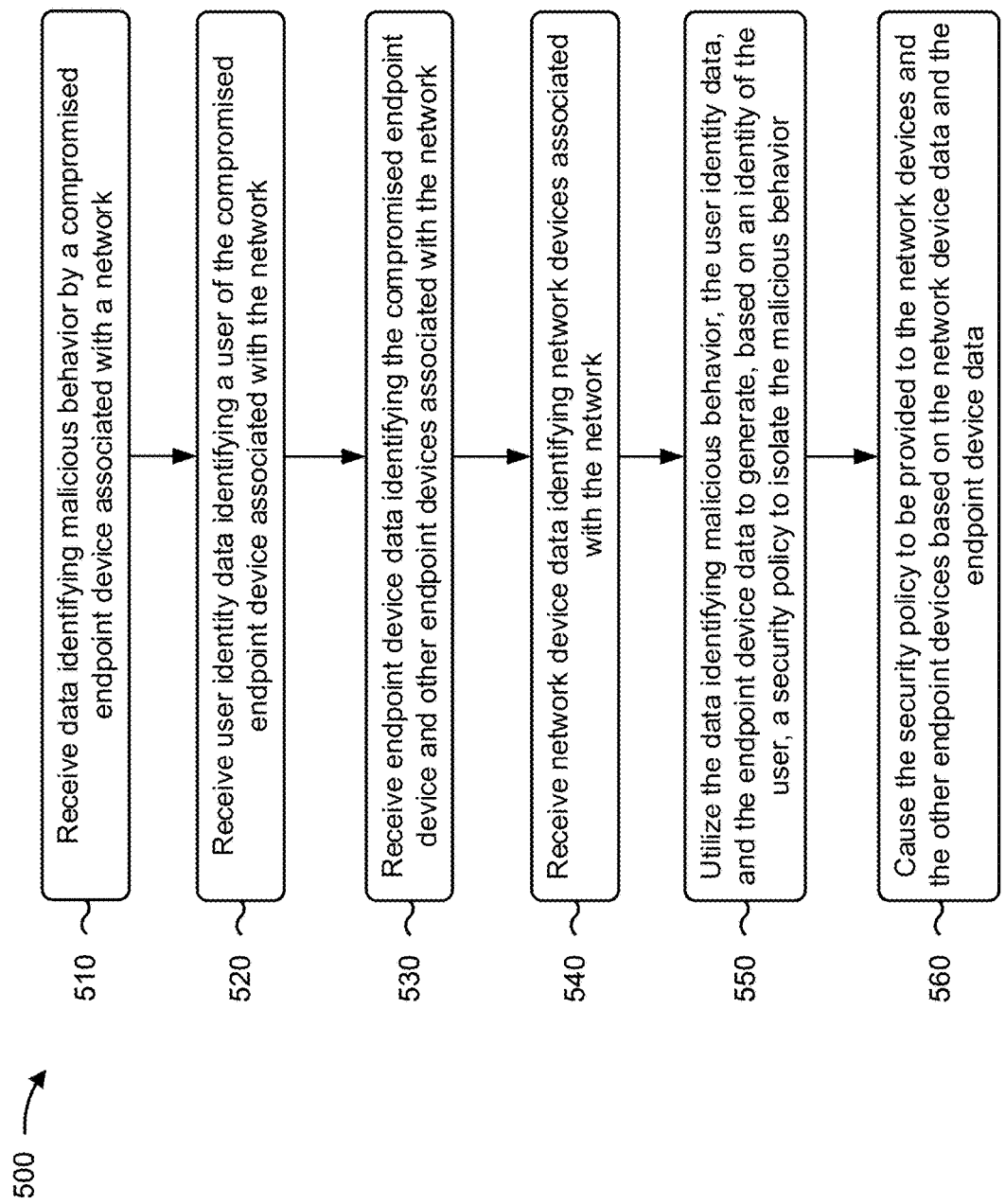

GENERATING A NETWORK SECURITY POLICY BASED ON A USER IDENTITY ASSOCIATED WITH MALICIOUS BEHAVIOR

BACKGROUND

Identifying malicious behavior (e.g., a cyberattack, malware, and/or the like) is typically a time-consuming process for a network security team. Many products exist that attempt to lure or trap a bad actor (e.g., a network intruder) into revealing themselves, and that trigger a wide variety of actions from a network (e.g., blocking the network intruder, stopping malware and/or a cyberattack, and/or the like).

SUMMARY

In some implementations, a method may include receiving data identifying malicious behavior by a compromised endpoint device associated with a network and receiving user identity data identifying a user of the compromised endpoint device associated with the network. The method may include receiving endpoint device data identifying the compromised endpoint device and other endpoint devices associated with the network and receiving network device data identifying network devices associated with the network. The method may include utilizing the data identifying malicious behavior, the user identity data, and the endpoint device data to generate, based on an identity of the user, a security policy to isolate the malicious behavior, and causing the security policy to be provided to the network devices and the other endpoint devices based on the network device data and the endpoint device data.

In some implementations, a device may include one or more memories and one or more processors to receive data identifying malicious behavior by a compromised endpoint device associated with a network and receive user identity data identifying a user of the compromised endpoint device associated with the network. The one or more processors may receive endpoint device data identifying the compromised endpoint device and other endpoint devices associated with the network and may receive network device data identifying network devices associated with the network. The one or more processors may utilize the data identifying malicious behavior, the user identity data, and the endpoint device data to generate, based on an identity of the user, a security policy to isolate the malicious behavior, and may cause the security policy to be provided to the network devices and the other endpoint devices based on the network device data and the endpoint device data. The one or more processors may cause one or more of the network devices to perform an action based on the security policy.

In some implementations, a non-transitory computer-readable medium may store a set of instructions that includes one or more instructions that, when executed by one or more processors of a device, cause the device to receive data identifying malicious behavior by a compromised endpoint device associated with a network and receive user identity data identifying a user of the compromised endpoint device associated with the network. The user identity data may include one or more of an email address associated with the user, an active directory username associated with the user, a username associated with the user, or a token associated with the user. The one or more instructions may cause the device to receive endpoint device data identifying the compromised endpoint device and other endpoint devices associated with the network and receive network device data identifying network devices associated with the network. The one or more instructions may cause the device to utilize the data identifying malicious behavior, the user identity data, and the endpoint device data to generate, based on an identity of the user, a security policy to isolate the malicious behavior, and cause the security policy to be provided to the network devices and the other endpoint devices based on the network device data and the endpoint device data.

BRIEF DESCRIPTION OF THE DRAWINGS

FIG. 5 is a flowchart of an example process for associated with generating a network security policy based on a user identity associated with malicious behavior.

DETAILED DESCRIPTION

Figure 1A:
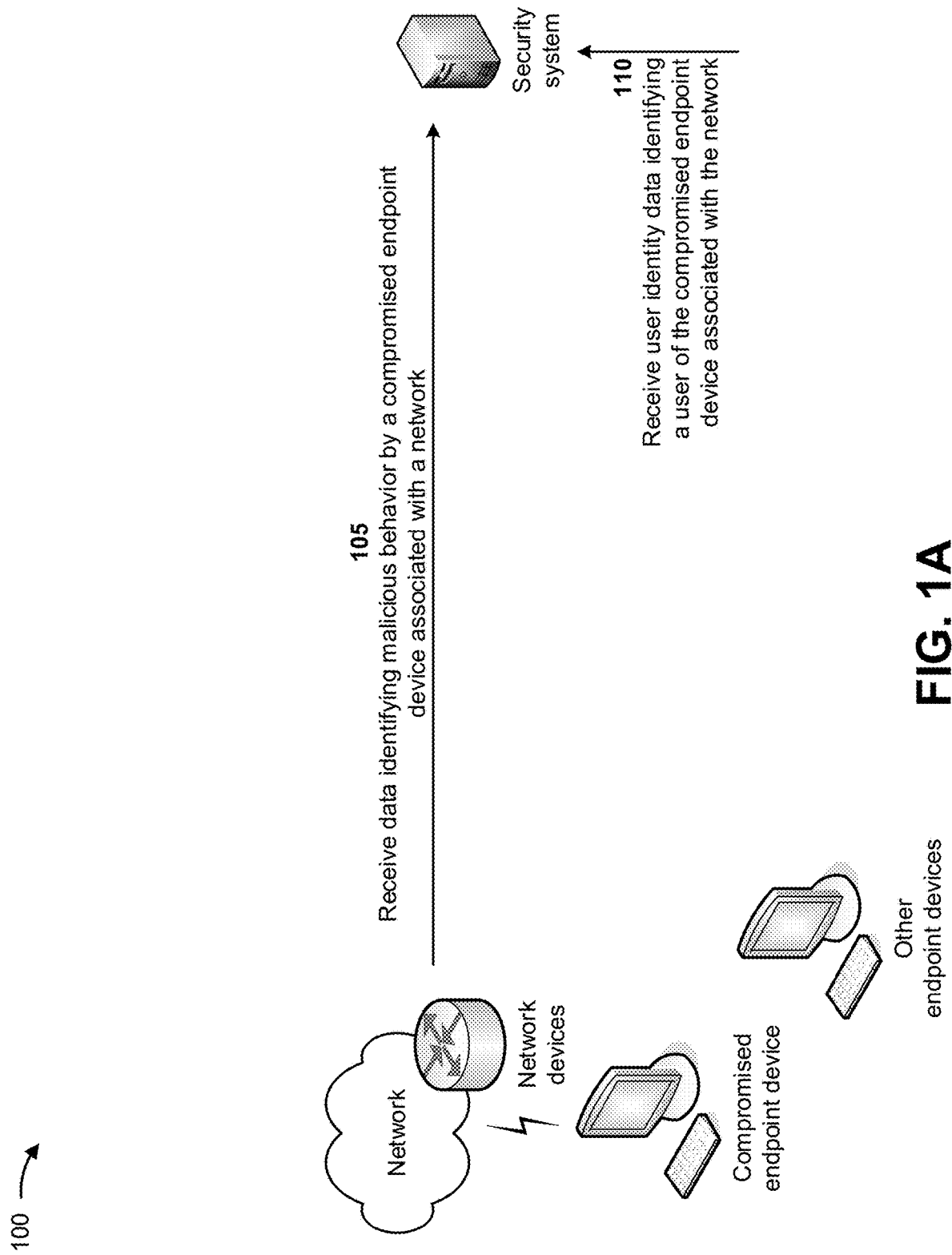
FIGS. 1A-1E are diagrams of an example associated with generating a network security policy based on a user identity associated with malicious behavior.

The following detailed description of example implementations refers to the accompanying drawings. The same reference numbers in different drawings may identify the same or similar elements.

Malicious behavior, such as related to a cyberattack, malware, and/or the like, may be caused by a bad actor (e.g., a network intruder) based on compromising an endpoint device associated with a network. The malicious behavior and/or the bad actor may be addressed if the malicious behavior and/or the bad actor are identified. However, current techniques for identifying the malicious behavior and/or the bad actor provide little insight into network behavior caused by the malicious behavior. Determining insight into such network behavior may be difficult, time consuming, and waste computing resources (e.g., processing resources, memory resources, communication resources, and/or the like), networking resources, and/or the like. For example, one technique detects the malicious behavior (e.g., that a malicious file has been downloaded) but provides no indication of whether the malicious file has been executed by an endpoint device, and is prone to false positive and/or negative indications of the malicious behavior. Another technique detects a malicious communication to an Internet protocol (IP) or uniform resource locator (URL) address but is prone to false positive and/or negative indications of malicious behavior and does not detect targeted network attacks.

Some implementations described herein relate to a security system that generates a network security policy based on a user identity associated with malicious behavior. For example, the security system may receive data identifying malicious behavior by a compromised endpoint device associated with a network and may receive user identity data identifying a user of the compromised endpoint device associated with the network. The security system may receive endpoint device data identifying the compromised endpoint device and other endpoint devices associated with the network and may receive network device data identifying network devices associated with the network. The security system may utilize the data identifying malicious behavior, the user identity data, and the endpoint device data to generate, based on an identity of the user, a security policy to isolate the malicious behavior, and may cause the security policy to be provided to the network devices and the other endpoint devices based on the network device data and the endpoint device data.

In this way, the security system generates a network security policy based on a user identity associated with malicious behavior. The security system may identify a malicious behavior associated with an endpoint device connected to a network and may identify user identity data (e.g., an email address, an active directory username, a username, a token, and/or the like) associated with the endpoint device. The security system may utilize the user identity data to generate a security policy to eliminate the malicious behavior and may share the security policy with network devices of the network. Thus, the security system conserves computing resources, networking resources, and/or that like that would otherwise have been consumed by generating false positive and/or negative indications of malicious behavior, failing to identify and provide insights into malicious behavior, attempting to address the false positive and/or negative indications of the malicious behavior and/or the like.

FIGS. 1A-1E are diagrams of an example 100 associated with generating a network security policy based on a user identity associated with malicious behavior. As shown in FIGS. 1A-1E, example 100 includes a security system associated with a network of network devices, a compromised endpoint device, and other endpoint devices. Further details of the security system, the network, the network devices, and the endpoint devices are provided elsewhere herein.

As shown in FIG. 1A, and by reference number 105, the security system may receive, from the one or more network devices, data identifying the malicious behavior by the compromised endpoint device associated with the network. In some implementations, the data identifying the malicious behavior may include data identifying a malicious action (e.g., that a malicious file has been downloaded), a malicious communication to or from a network address (e.g., a media access control (MAC) address associated with the compromised endpoint device, an internet protocol (IP) address associated with the compromised endpoint device, a uniform resource locator (URL) address associated with the compromised endpoint device, and/or the like), a serial number associated with the compromised endpoint device, data identifying a manufacturer associated with the compromised endpoint device, data identifying a make or model associated with the compromised endpoint device, and/or the like.

As further shown in FIG. 1A, and by reference number 110, the security system may receive user identity data identifying a user of the compromised endpoint device associated with the network. For example, the security system may receive the user identity data from a device that maintains an active directory of data associated with users of the compromised endpoint device and the other endpoint devices. In some implementations, the security system may compare the data of the active directory with the network address of the compromised endpoint device to determine the user identity data identifying the user of the compromised endpoint device. In some implementations, the user identity data includes one or more of an email address associated with the user of the compromised endpoint device, an active directory username associated with the user of the compromised endpoint device, a username associated with the user of the compromised endpoint device, a token associated with the user of the compromised endpoint device, and/or the like.

In some implementations, the security system may receive (e.g., from one or more of the network devices) traffic or traffic data (e.g., header data, payload data, and/or the like) associated with the compromised endpoint device after the malicious behavior is identified. The traffic associated with the compromised endpoint device may include traffic attempting to spread the malicious behavior within the network, to one or more of the other endpoint devices, to one or more of the network devices, and/or the like. The one or more of the network devices may automatically provide the traffic or traffic data associated with the compromised endpoint device to the security system based on identifying the malicious behavior. In some implementations, the security system configures the one or more of the network devices, once the security system is notified of the malicious behavior, to start forwarding any traffic where the compromised endpoint device is a source or a destination.

Figure 1B:
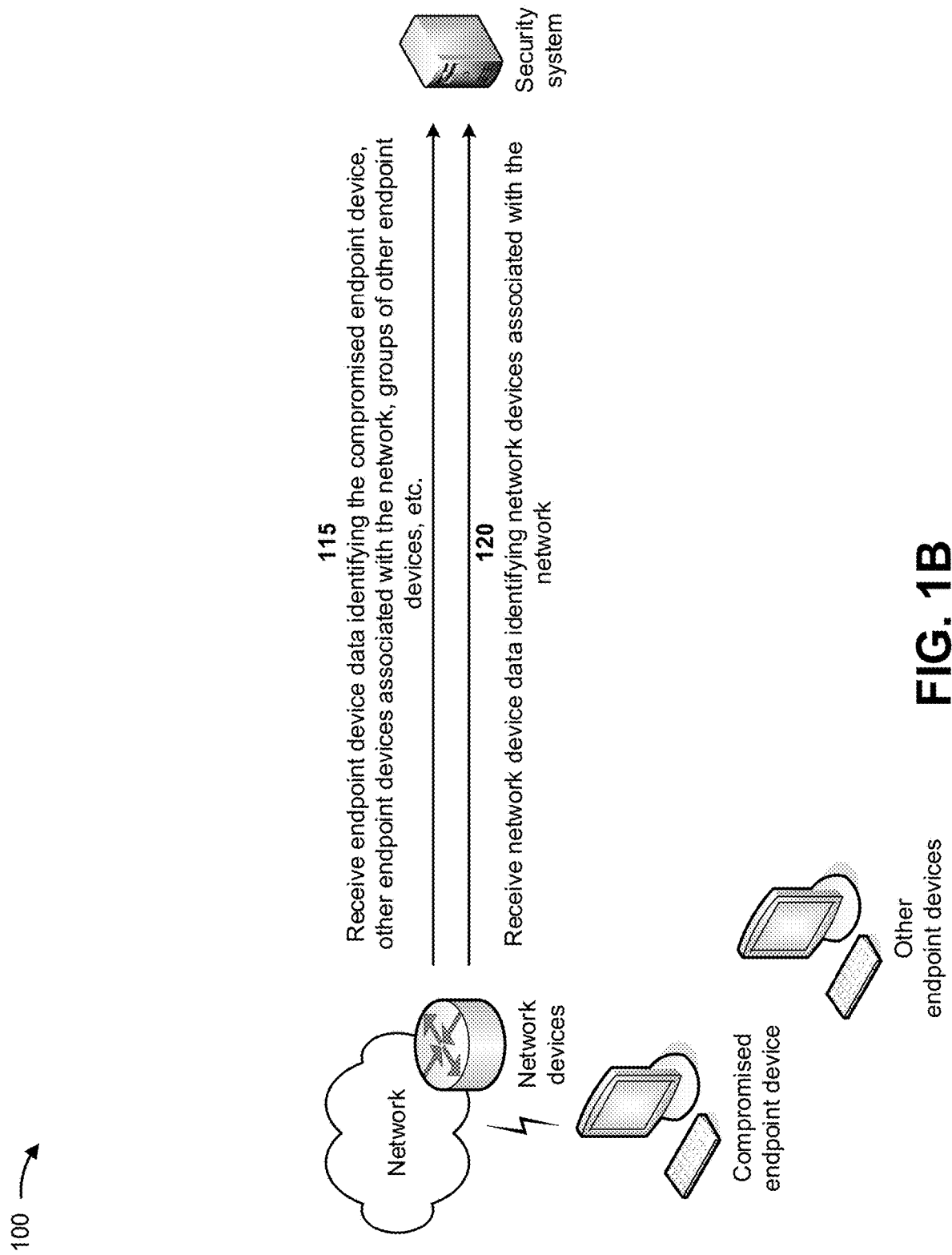

As shown in FIG. 1B, and by reference number 115, the security system may receive (e.g., from one or more of the network devices or from the other endpoint devices) endpoint device data identifying the compromised endpoint device, the other endpoint devices associated with the network, groups of the other endpoint devices, and/or the like. In some implementations, the endpoint device data, for each of the endpoint devices, may include a MAC address associated with the endpoint device, an IP address associated with the endpoint device, a URL associated with the endpoint device, a serial number associated with the endpoint device, data identifying a manufacturer associated with the endpoint device, data identifying a make or model associated with the endpoint device, topology data (e.g., data identifying neighboring endpoint devices and/or network devices, interconnections between the endpoint devices and/or the network devices, etc.), and/or the like. In some implementations, the security system configures the compromised endpoint device, the other endpoint devices, and/or the network devices to forward the endpoint device data once the security system is notified of the malicious behavior.

As further shown in FIG. 1B, and by reference number 120, the security system may receive (e.g., from the network devices) network device data identifying the network devices associated with the network. In some implementations, the network device data, for a network device, may include a MAC address associated with the network device, an IP address associated with the network device, a serial number associated with the network device, data identifying a manufacturer associated with the network device, data identifying a make or model associated with the network device, topology data (e.g., data identifying neighboring endpoint devices and/or network devices, interconnections between the endpoint devices and/or the network devices, etc.), and/or the like. In some implementations, the security system configures the network devices to forward the network device data once the security system is notified of the malicious behavior.

In some implementations, the security system may store the user identity data, the data identifying the malicious behavior, the traffic associated with the compromised endpoint device, the endpoint device data, and/or the network device data in a data structure (e.g., a database, a table, a list, and/or the like) associated with the security system. The security system may store such data so that the security system may process such data to generate a security policy to isolate the compromised endpoint device. In some implementations, the security system may temporarily store the user identity data until the security policy is generated to isolate the compromised endpoint device and to prevent the malicious behavior from spreading in the network.

Figure 1C:
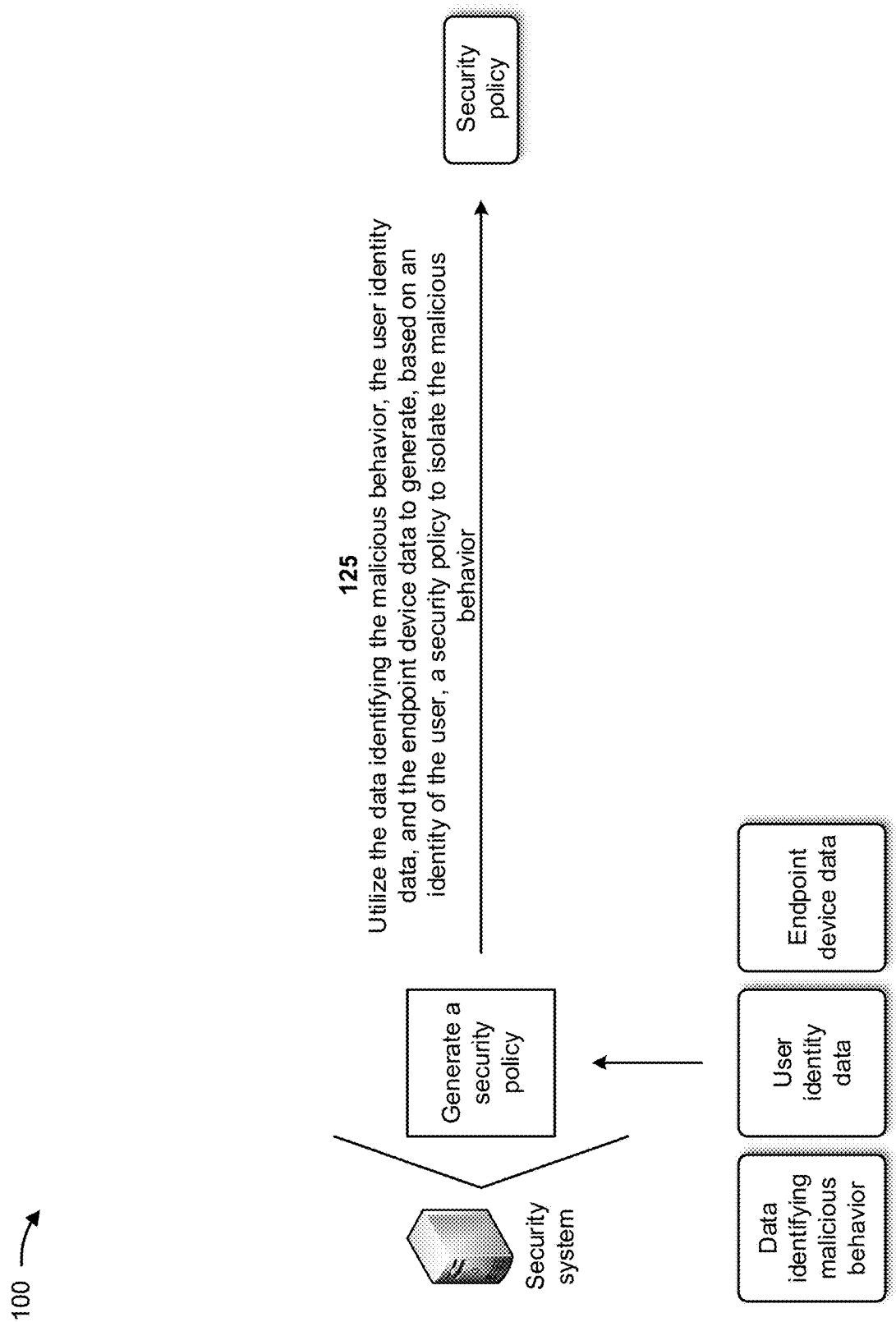

As shown in FIG. 1C, and by reference number 125, the security system may utilize the data identifying the malicious behavior, the user identity data, and the endpoint device data to generate, based on an identity of the user, a security policy to isolate the malicious behavior. In some implementations, the security system may generate a security policy that includes the identity of the user in a source field, a destination field, or in both the source and destination fields for one or more traffic feeds that are user identity-based traffic feeds. For example, the security policy may include language that rejects traffic associated with a source identity field (e.g., that adds a source user identity to a traffic feed), a source address field (e.g., that adds a source network address of the compromised endpoint device to the traffic feed), a destination identity field (e.g., that adds a destination user identity to the traffic feed), a destination address field (e.g., that adds a destination network address of the compromised endpoint device to the traffic feed), and/or the like.

In some implementations, when utilizing the data identifying malicious behavior, the user identity data, and the endpoint device data to generate the security policy, the security system may generate a security rule for the security policy that causes the user identity data associated with the compromised endpoint device to be added to a traffic feed of the compromised endpoint device; may generate a security rule for the security policy that temporarily adds the user identity data associated with the compromised endpoint device to a blacklist and causes the blacklist to be propagated to the network devices and the other endpoint devices; and/or the like.

In some implementations, the security system may generate a security policy that enables the network devices to check a source or a destination against a user identity-based traffic feed. For example, the security policy may include the user identity data provided in a destination field of a match criterion of the security policy and the user identity data provided in a source field of the match criterion of the security policy. The security policy may also include other match criteria, such as a match criterion associated with an application port of the compromised endpoint device, a destination address of the compromised endpoint device, an excluded destination address, a dynamic application or group, a multiple source zone, a source address of the compromised endpoint device, an excluded source address, a multiple destination zone, a URL category, and/or the like.

In some implementations, the security system may process the data identifying the malicious behavior, the user identity data, and the endpoint device data, with a machine learning model, to generate a security policy to isolate the malicious behavior. For example, the machine learning model may generate the security policy by identifying one or more security rules to be implemented by one or more of the network devices and/or one or more of the other endpoint devices.

Examples of security rules that may be included in the security policy include a security rule that causes the user identity data to be added to a traffic feed of the compromised endpoint device and/or to be associated with a tag and/or metadata; a security rule that causes a network address of the compromised endpoint device to be added to a traffic feed of the compromised endpoint device and/or to be associated with a tag and/or metadata; a security rule that temporarily adds the use identity data and/or the network address of the compromised endpoint device to a blacklist and causes the blacklist to be propagated to the network devices and/or the other endpoint devices based on network addresses of the network devices and the other endpoint devices; a security rule that defines groups of the network devices based on the network addresses of the network devices; a security rule that defines groups of the other endpoint devices based on the network addresses of the other endpoint devices; a security rule that utilizes the user identity data to prevent the compromised endpoint device from accessing the network; a security rule that modifies security rules associated with the network devices; a security rule that modifies intrusion prevention system rules associated with the network; a security rule that notifies one or more of the network devices of the compromised endpoint device; a security rule that causes one or more of the network devices to perform an action; and/or the like. These are merely examples of security rules that might be included in a security policy, and the security rules may be different in a different context.

In some implementations, the security system may generate a security policy that has potentially one or more security rules. In such implementations, the security system may determine an order to implement the multiple security rules. The security system may implement some security rules before other security rules, may implement some security rules at the same time, and/or the like. For example, the machine learning model may output data that assists the security system in determining the order in which to implement the security rules, or the security system may utilize a different model to determine the order in which to implement the security rules. An input to the different model may include a list of the security rules to implement, and an output of the different model may include the order to implement the security rules.

In some implementations, the security system may train the machine learning model, with historical data, to identify security rules (or the machine learning model determines confidence scores for security rules and/or identifies top scoring security rules) for a current malicious behavior situation (e.g., associated with the traffic of the compromised endpoint device, the endpoint device data, and the network device data). The historical data may include data identifying malicious behavior exhibited by compromised endpoint devices; data identifying effects of the malicious behavior on networks, network devices, and/or other endpoint devices; historical traffic associated with compromised endpoint devices; historical endpoint device data; historical network device data; historical topology data; security rules or actions that were implemented and were successful or unsuccessful; and/or the like. In some implementations, the security system may not train the machine learning model but may receive the trained machine learning model from another device.

Figure 1D:
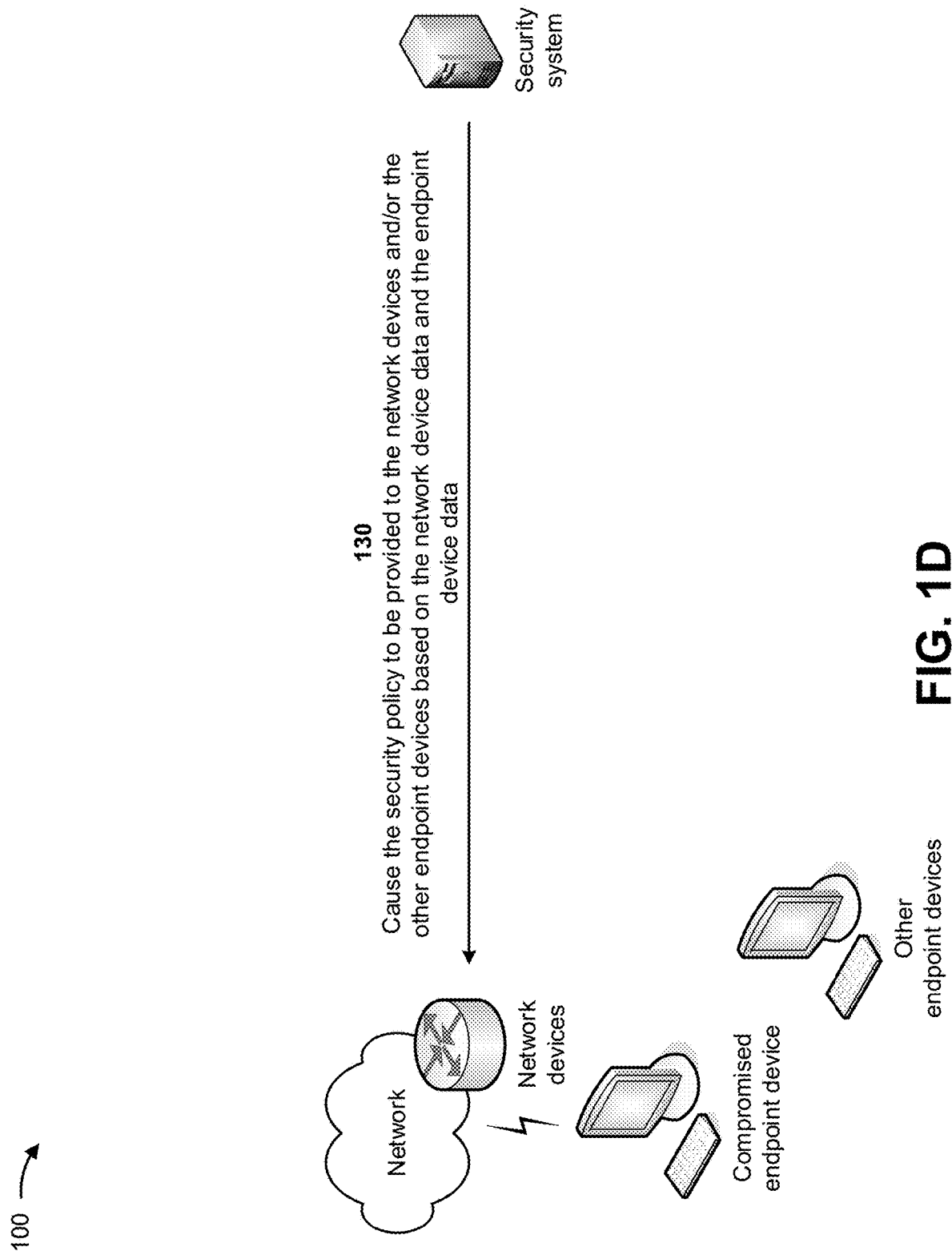

As shown in FIG. 1D, and by reference number 130, the security system may cause the security policy to be provided to the network devices and/or the other endpoint devices based on the network device data and the endpoint device data. For example, the security system may utilize the addresses of the network devices and the other endpoint devices to provide the security policy to the network devices and the other endpoint devices. In some implementations, the security system may provide the security policy to one of the network devices with an instruction to forward the security policy to the other network devices. The one of the network devices may forward the security policy to the other network devices based on the instructions. In some implementations, the security system may provide the security policy to one of the other endpoint devices with an instruction to forward the security policy to the remaining other endpoint devices. The one of the other endpoint devices may forward the security policy to the remaining other endpoint devices based on the instructions.

Figure 1E:
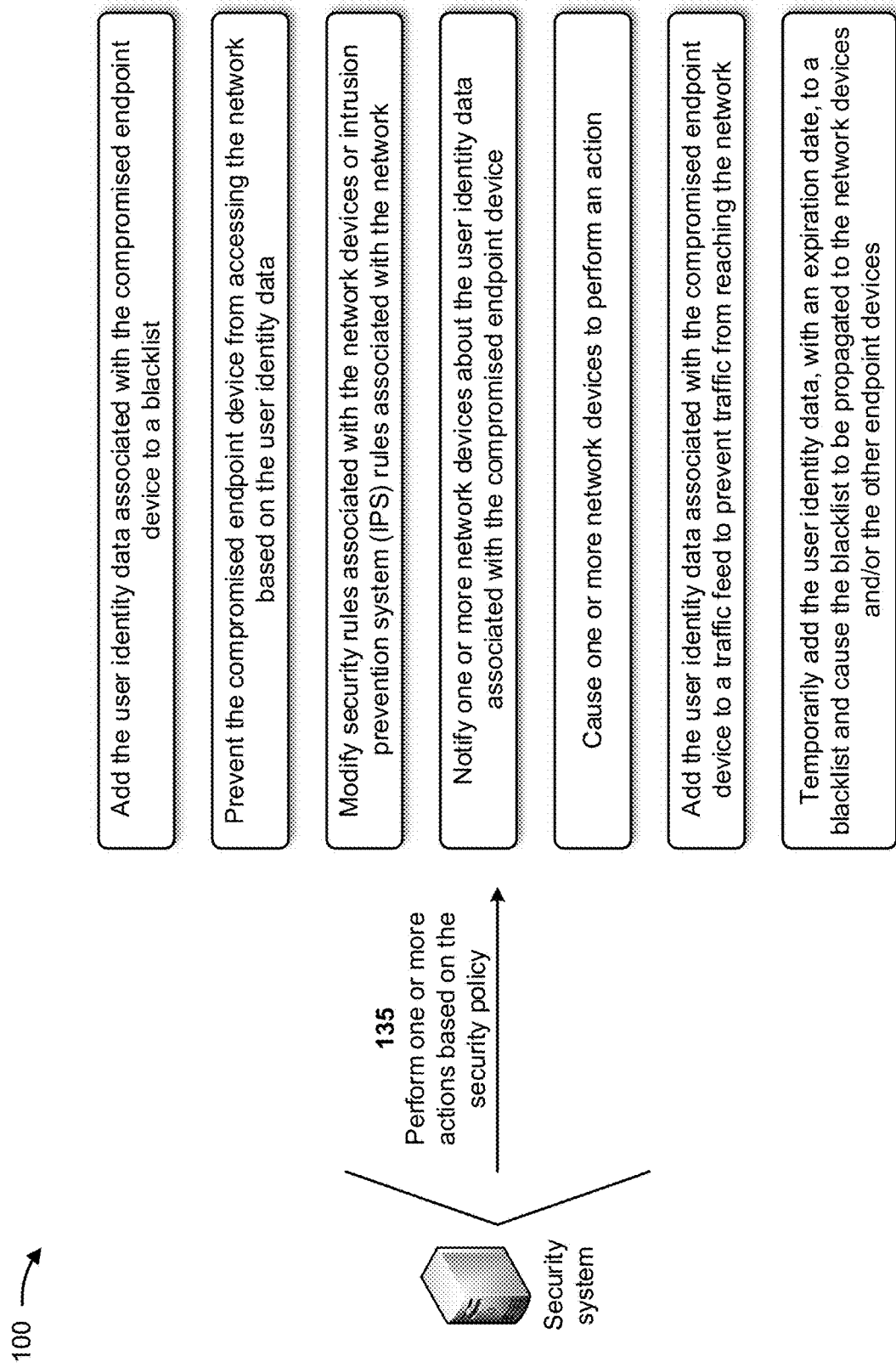

As shown in FIG. 1E, and by reference number 135, the security system may perform one or more actions based on the security policy. In some implementations, the one or more actions include the security system adding the user identity data associated with the compromised endpoint device to a blacklist. The security system may provide the blacklist to the network devices so that the compromised endpoint device may be prevented from accessing the network and/or the other endpoint devices. In this way, the compromised endpoint device may be prevented from spreading the malicious behavior to the network and/or the other endpoint devices.

In some implementations, the one or more actions include the security system preventing the compromised endpoint device from accessing the network based on the user identity data. For example, the security system may cause the user identity data to be added to a traffic feed of the compromised endpoint device. In this way, the network devices may recognize and block traffic coming from the compromised endpoint device, based on the user identity data.

In some implementations, the one or more actions include the security system modifying or updating security rules associated with the network devices so that the network devices may increase security associated with accessing the network and prevent the compromised endpoint device from spreading the malicious behavior to the network. In some implementations, the one or more actions include the security system modifying or updating rules for a network device (e.g., an intrusion prevention system) associated with the network to increase security associated with accessing the network and prevent the compromised endpoint device from spreading the malicious behavior to the network.

In some implementations, the one or more actions include the security system notifying one or more network devices about the user identity data associated with the compromised endpoint device. In this way, the one or more network devices may take measures to block traffic coming from any source associated with the user identity data.

In some implementations, the one or more actions include the security system causing one or more network devices to perform an action, such as block traffic associated with the user identity data, quarantine traffic associated with the user identity data, and/or the like. In this way, the compromised endpoint device or another endpoint device associated with the user identity data may be prevented from spreading the malicious behavior to the network and/or the other endpoint devices.

In some implementations, the one or more actions include the security system adding the user identity data associated with the compromised endpoint device to a traffic feed of the compromised endpoint device to prevent traffic of the compromised endpoint device from reaching the network. The user identity data may enable the network devices to recognize and block (or quarantine) traffic coming from the compromised endpoint device and associated with the user identity data. In this way, the network devices may recognize and prevent traffic, coming from the compromised endpoint device, from reaching the network.

In some implementations, the one or more actions include the security system temporarily adding the user identity data, with an expiration date, to a blacklist and causing the blacklist to be propagated to the network devices. In some implementations, the user identity data may be associated with the expiration date so that the user identity data is removed from the blacklist on the expiration date. In this way, the security system may ensure that a file size of the blacklist remains manageable and consumes minimal memory space in the network devices. In some implementations, the user identity data may not be associated with an expiration date and may not be removed from the blacklist.

In some implementations, the one or more actions include the security system temporarily adding the user identity data, with the expiration date, to a blacklist and providing the blacklist to a first network device. The security system may also provide, to the first network device, an instruction that causes the first network device to provide the blacklist to the other network devices. The user identity data may enable the network devices to recognize and block traffic from the network and destined for the compromised endpoint device. In this way, the network devices may recognize and prevent traffic, coming from the network, from reaching the compromised endpoint device.

In some implementations, the one or more actions include the security system temporarily adding the user identity data, with an expiration date, to a blacklist and causing the blacklist to be propagated to the other endpoint devices. The user identity data may be associated with the expiration date so that the user identity data is removed from the blacklist on the expiration date. In this way, the security system may ensure that a file size of the blacklist remains manageable and consumes minimal memory space in the other endpoint devices. In some implementations, the user identity data may not be associated with an expiration date and may not be removed from the blacklist.

In some implementations, the one or more actions include the security system temporarily adding the user identity data, with the expiration date, to the blacklist and providing the blacklist to a first other endpoint device. The security system may also provide, to the first other endpoint device, an instruction that causes the first other endpoint device to provide the blacklist to the other endpoint devices. The user identity data may enable the other endpoint devices to recognize and block (or quarantine) traffic associated with the user identity data. In this way, the other endpoint devices may recognize and prevent traffic, coming from the compromised endpoint device, from reaching the other endpoint devices.

In some implementations, the one or more actions include the security system pushing a security update to the compromised endpoint device so that the compromised endpoint device may be better protected from a bad actor. In this way, the security update may eliminate the malicious behavior from the compromised endpoint device.

In some implementations, the one or more actions include the security system causing the compromised endpoint device to initiate a malware and/or a virus scan to ensure that the compromised endpoint device is not infected with malware and/or a virus. In some implementations, the one or more actions include the security system causing the compromised endpoint device to be taken offline (e.g., disconnect from the network) so that the compromised endpoint device may not harm the network. In some implementations, the one or more actions include the security system sending a notification for display on the compromised endpoint device (e.g., to inform a user that the endpoint device has been compromised).

In this way, the security system generates a network security policy based on a user identity associated with malicious behavior. The security system may identify a malicious behavior associated with an endpoint device connected to a network and may identify user identity data associated with the endpoint device. The security system may utilize the user identity data to generate a security policy to eliminate the malicious behavior and may share the security policy with network devices of the network. Thus, the security system conserves computing resources, networking resources, and/or that like that would otherwise have been consumed by generating false positive and/or negative indications of malicious behavior, failing to identify and provide insights into malicious behavior, attempting to address the false positive and/or negative indications of the malicious behavior and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
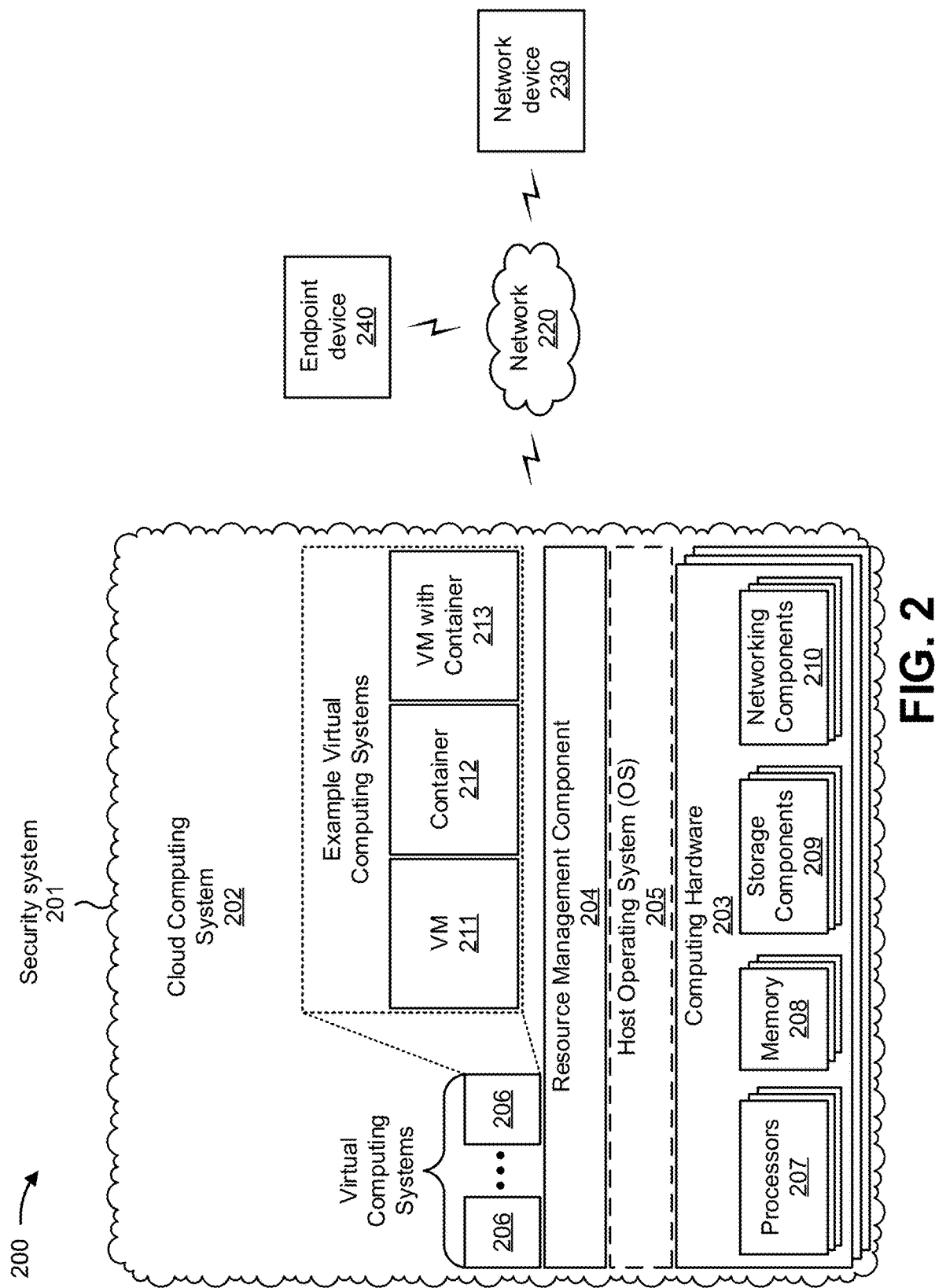
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a security system 201, which may include one or more elements of and/or may execute within a cloud computing system 202. The cloud computing system 202 may include one or more elements 203-213, as described in more detail below. As further shown in FIG. 2, environment 200 may include a network 220, a network device 230, and/or an endpoint device 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the security system 201 may include one or more elements 203-213 of the cloud computing system 202, may execute within the cloud computing system 202, and/or may be hosted within the cloud computing system 202, in some implementations, the security system 201 may not be cloud-based (e.g., may be implemented outside of a cloud computing system) or may be partially cloud-based. For example, the security system 201 may include one or more devices that are not part of the cloud computing system 202, such as device 300 of FIG. 3, which may include a standalone server or another type of computing device. The security system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of environment 200.

The network device 230 may include one or more devices capable of receiving, processing, storing, routing, and/or providing traffic (e.g., a packet and/or other information or metadata) in a manner described herein. For example, the network device 230 may include a router, such as a label switching router (LSR), a label edge router (LER), an ingress router, an egress router, a provider router (e.g., a provider edge router or a provider core router), a virtual router, or another type of router. Additionally, or alternatively, the network device 230 may include a gateway, a switch, a firewall, a hub, a bridge, a reverse proxy, a server (e.g., a proxy server, a cloud server, or a data center server), a load balancer, and/or a similar device. In some implementations, the network device 230 may be a physical device implemented within a housing, such as a chassis. In some implementations, the network device 230 may be a virtual device implemented by one or more computing devices of a cloud computing environment or a data center. In some implementations, a group of network devices 230 may be a group of data center nodes that are used to route traffic flow through a network.

The endpoint device 240 includes one or more devices capable of receiving, generating, storing, processing, and/or providing information, such as information described herein. For example, the endpoint device 240 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 240 may receive network traffic from and/or may provide network traffic to other endpoint devices 240, via the network 220 (e.g., by routing packets using the network devices 230 as intermediaries).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
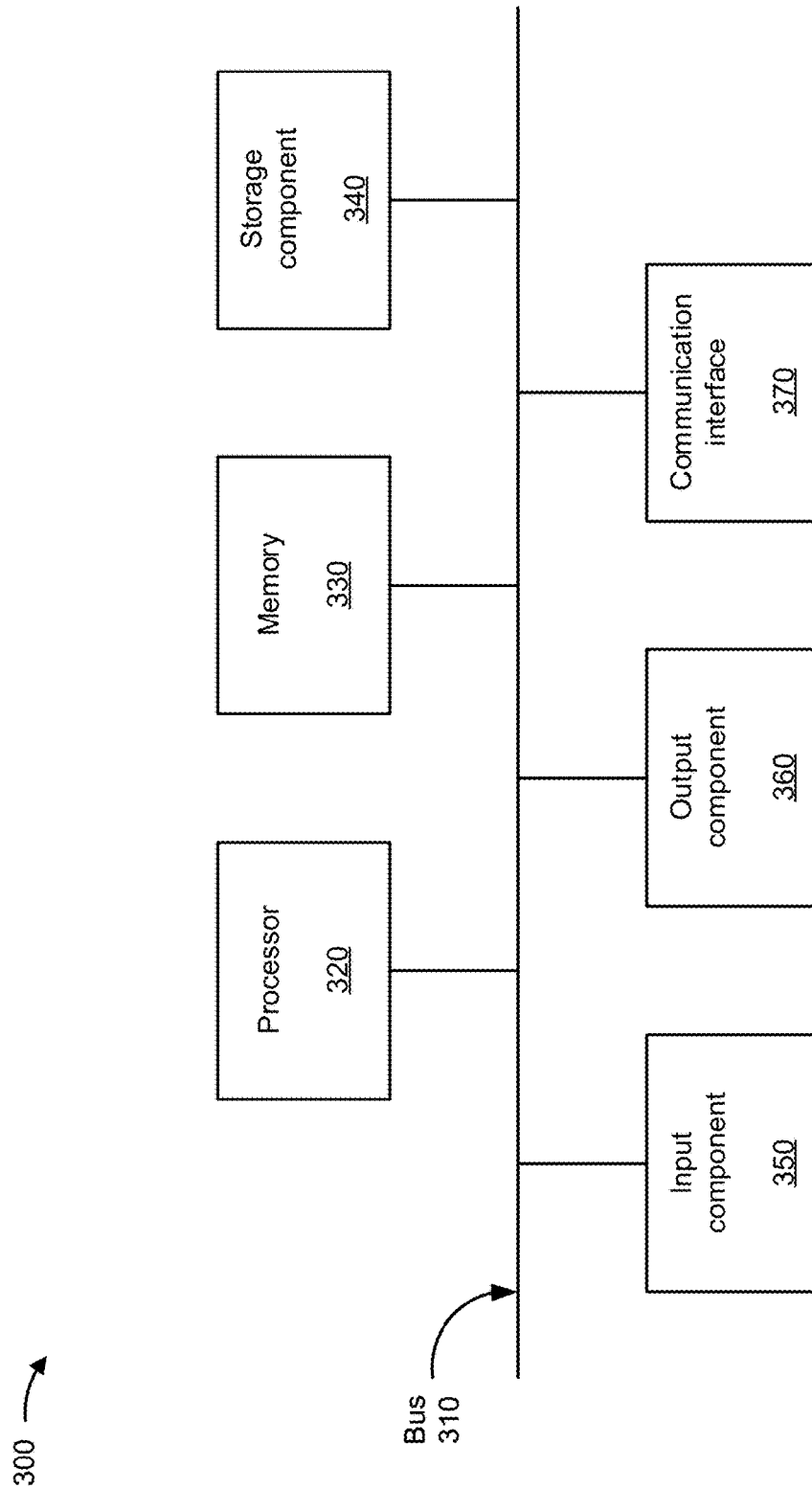
FIGS. 3 and 4 are diagrams of example components of one or more devices of FIG. 2.

FIG. 3 is a diagram of example components of one or more devices of FIG. 2. The example components may be included in a device 300, which may correspond to the security system 201, the network device 230, and/or the endpoint device 240. In some implementations, the security system 201, the network device 230, and/or the endpoint device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
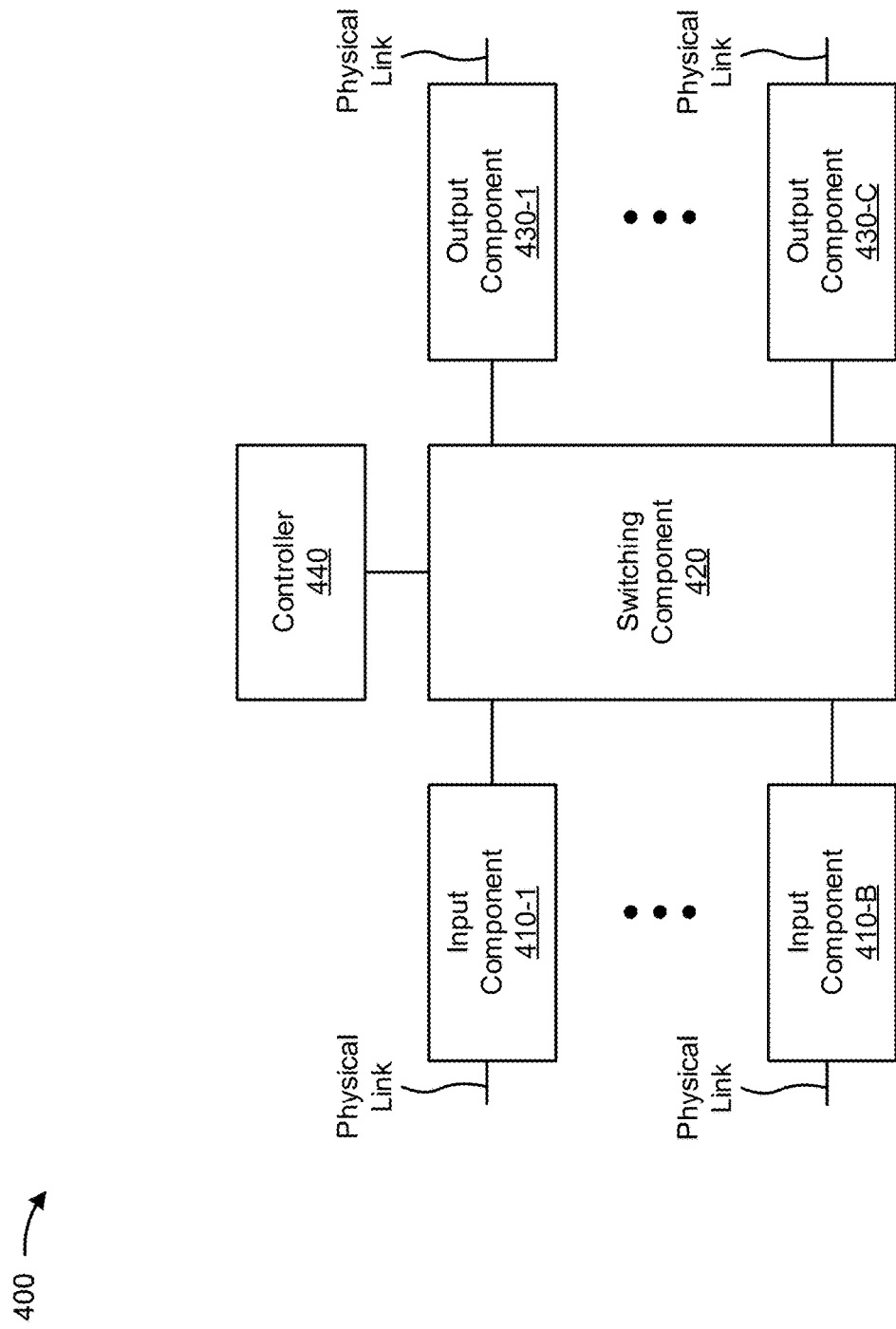

FIG. 4 is a diagram of example components of one or more devices of FIG. 2. The example components may be included in a device 400. Device 400 may correspond to the network device 230. In some implementations, the network device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for generating a network security policy based on a user identity associated with malicious behavior. In some implementations, one or more process blocks of FIG. 5 may be performed by a device (e.g., the security system 201). In some implementations, one or more process blocks of FIG. 5 may be performed by another device or a group of devices separate from or including the device, such as a network device (e.g., the network device 230) and/or an endpoint device (e.g., the endpoint device 240). Additionally, or alternatively, one or more process blocks of FIG. 5 may be performed by one or more components of the device 300, such as the processor 320, the memory 330, the storage component 340, the input component 350, the output component 360, and/or the communication component 370. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving data identifying malicious behavior by a compromised endpoint device associated with a network (block 510). For example, the device may receive data identifying malicious behavior by a compromised endpoint device associated with a network, as described above.

As further shown in FIG. 5, process 500 may include receiving user identity data identifying a user of the compromised endpoint device associated with the network (block 520). For example, the device may receive user identity data identifying a user of the compromised endpoint device associated with the network, as described above. In some implementations, the user identity data includes one or more of an email address associated with the user, an active directory username associated with the user, a username associated with the user, or a token associated with the user.

As further shown in FIG. 5, process 500 may include receiving endpoint device data identifying the compromised endpoint device and other endpoint devices associated with the network (block 530). For example, the device may receive endpoint device data identifying the compromised endpoint device and other endpoint devices associated with the network, as described above.

As further shown in FIG. 5, process 500 may include receiving network device data identifying network devices associated with the network (block 540). For example, the device may receive network device data identifying network devices associated with the network, as described above.

As further shown in FIG. 5, process 500 may include utilizing the data identifying malicious behavior, the user identity data, and the endpoint device data to generate, based on an identity of the user, a security policy to isolate the malicious behavior (block 550). For example, the device may utilize the data identifying malicious behavior, the user identity data, and the endpoint device data to generate, based on an identity of the user, a security policy to isolate the malicious behavior, as described above. In some implementations, utilizing the data identifying malicious behavior, the user identity data, and the endpoint device data to generate the security policy includes generating a first security rule for the security policy that causes the user identity data associated with the compromised endpoint device to be added to a traffic feed of the compromised endpoint device, and generating a second security rule for the security policy that temporarily adds the user identity data associated with the compromised endpoint device to a blacklist and causes the blacklist to be propagated to the network devices and the other endpoint devices. In some implementations, the security policy includes the user identity data provided in a destination field of a match criterion of the security policy, and the user identity data provided in a source field of the match criterion of the security policy.

As further shown in FIG. 5, process 500 may include causing the security policy to be provided to the network devices and the other endpoint devices based on the network device data and the endpoint device data (block 560). For example, the device may cause the security policy to be provided to the network devices and the other endpoint devices based on the network device data and the endpoint device data, as described above.

Process 500 may include additional implementations, such as any single implementation or any combination of implementations described below and/or in connection with one or more other processes described elsewhere herein.

In some implementations, process 500 includes adding the user identity data associated with the compromised endpoint device to a blacklist and providing the blacklist to the network devices and the other endpoint devices. In some implementations, process 500 includes preventing the compromised endpoint device from accessing the network based on the user identity data.

In some implementations, process 500 includes modifying, based on the security policy, security rules associated with the network devices to generate modified security rules; modifying, based on the security policy, intrusion prevention system rules associated with the network to generate modified intrusion prevention system rules; providing the modified security rules to the network devices; and providing the modified intrusion prevention system rules to an intrusion prevention system. In some implementations, process 500 includes notifying one or more of the network devices about the user identity data associated with the compromised endpoint device. In some implementations, process 500 includes causing one or more of the network devices to perform an action based on the security policy.

In some implementations, process 500 includes adding the user identity data associated with the compromised endpoint device to a traffic feed of the compromised endpoint device to prevent traffic associated with the compromised endpoint device from reaching the network. In some implementations, process 500 includes temporarily adding the user identity data, with an expiration date, to a blacklist, and causing the blacklist to be propagated to the network devices, wherein the blacklist, after the user identity data is added, is to cause the network devices to prevent traffic of the network from being provided to the compromised endpoint device.

In some implementations, process 500 includes temporarily adding the user identity data, with an expiration date, to a blacklist, and causing the blacklist to be propagated to the other endpoint devices, wherein the blacklist, after the user identity data is added, is to prevent traffic associated with the compromised endpoint device from reaching the other endpoint devices. In some implementations, process 500 includes temporarily adding the user identity data, with an expiration date, to a blacklist, and causing the blacklist to be propagated to the other endpoint devices, wherein the blacklist, after the user identity data is added, is to prevent traffic of the other endpoint devices from being provided to the compromised endpoint device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, data identifying malicious behavior by a compromised endpoint device associated with a network;
receiving, by the device, user identity data identifying a user of the compromised endpoint device associated with the network;
receiving, by the device, endpoint device data identifying the compromised endpoint device and other endpoint devices associated with the network;
receiving, by the device, network device data identifying network devices associated with the network;
utilizing, by the device, the data identifying malicious behavior, the user identity data, and the endpoint device data to generate, based on an identity of the user, a security policy to isolate the malicious behavior;
causing, by the device, the security policy to be provided to the network devices and the other endpoint devices based on the network device data and the endpoint device data; and
adding, by the device, the user identity data associated with the compromised endpoint device to a traffic feed of the compromised endpoint device to prevent traffic associated with the compromised endpoint device from reaching the network.

2. The method of claim 1, further comprising:
adding the user identity data associated with the compromised endpoint device to a blacklist; and
providing the blacklist to the network devices and the other endpoint devices.

3. The method of claim 1, further comprising:
preventing the compromised endpoint device from accessing the network based on the user identity data.

4. The method of claim 1, further comprising:
modifying, based on the security policy, security rules associated with the network devices to generate modified security rules;
modifying, based on the security policy, intrusion prevention system rules associated with the network to generate modified intrusion prevention system rules;
providing the modified security rules to the network devices; and
providing the modified intrusion prevention system rules to an intrusion prevention system.

5. The method of claim 1, further comprising:
notifying one or more of the network devices about the user identity data associated with the compromised endpoint device.

6. The method of claim 1, further comprising:
causing one or more of the network devices to perform an action based on the security policy.

7. The method of claim 1, wherein the user identity data includes one or more of:
an email address associated with the user,
an active directory username associated with the user,
a username associated with the user, or
a token associated with the user.

8. A device, comprising:
one or more memories; and
one or more processors to:
receive data identifying malicious behavior by a compromised endpoint device associated with a network;
receive user identity data identifying a user of the compromised endpoint device associated with the network;
receive endpoint device data identifying the compromised endpoint device and other endpoint devices associated with the network;
receive network device data identifying network devices associated with the network;
utilize the data identifying malicious behavior, the user identity data, and the endpoint device data to generate, based on an identity of the user, a security policy to isolate the malicious behaviors,
wherein the one or more processors, to utilize the data identifying malicious behavior, the user identity data, and the endpoint device data to generate the security policy, are to generate a first security rule for the security policy that causes the user identity data associated with the compromised endpoint device to be added to a traffic feed of the compromised endpoint device;
cause the security policy to be provided to the network devices and the other endpoint devices based on the network device data and the endpoint device data; and
cause one or more of the network devices to perform an action based on the security policy.

9. The device of claim 8, wherein the one or more processors are further to:
temporarily add the user identity data, with an expiration date, to a blacklist; and
cause the blacklist to be propagated to the network devices,
wherein the blacklist, after the user identity data is added, is to cause the network devices to prevent traffic of the network from being provided to the compromised endpoint device.

10. The device of claim 8, wherein the one or more processors are further to:
temporarily add the user identity data, with an expiration date, to a blacklist; and
cause the blacklist to be propagated to the other endpoint devices,
wherein the blacklist, after the user identity data is added, is to prevent traffic associated with the compromised endpoint device from reaching the other endpoint devices.

11. The device of claim 8, wherein the one or more processors are further to:
temporarily add the user identity data, with an expiration date, to a blacklist; and
cause the blacklist to be propagated to the other endpoint devices,
wherein the blacklist, after the user identity data is added, is to prevent traffic of the other endpoint devices from being provided to the compromised endpoint device.

12. The device of claim 8, wherein the one or more processors, to utilize the data identifying malicious behavior, the user identity data, and the endpoint device data to generate the security policy, are further to:
generate a second security rule for the security policy that temporarily adds the user identity data associated with the compromised endpoint device to a blacklist and causes the blacklist to be propagated to the network devices and the other endpoint devices.

13. The device of claim 8, wherein the security policy includes:

the user identity data provided in a destination field of a match criterion of the security policy, and the user identity data provided in a source field of the match criterion of the security policy.

14. The device of claim 8, wherein the user identity data includes one or more of:

an email address associated with the user, an active directory username associated with the user, a username associated with the user, or a token associated with the user.

15. The device of claim 8, wherein the user identity data includes one or more of:

an email address associated with the user, a username associated with the user, or a token associated with the user.

16. A non-transitory computer-readable medium storing a set of instructions, the set of instructions comprising:

one or more instructions that, when executed by one or more processors of a device, cause the device to:

receive data identifying malicious behavior by a compromised endpoint device associated with a network;

receive user identity data identifying a user of the compromised endpoint device associated with the network, wherein the user identity data includes one or more of:

an email address associated with the user, an active directory username associated with the user, a username associated with the user, or a token associated with the user;

receive endpoint device data identifying the compromised endpoint device and other endpoint devices associated with the network;

receive network device data identifying network devices associated with the network;

utilize the data identifying malicious behavior, the user identity data, and the endpoint device data to generate, based on an identity of the user, a security policy to isolate the malicious behavior;

cause the security policy to be provided to the network devices and the other endpoint devices based on the network device data and the endpoint device data; and add the user identity data associated with the compromised endpoint device to a traffic feed of the compromised endpoint device to prevent traffic associated with the compromised endpoint device from reaching the network.

17. The non-transitory computer-readable medium of claim 16, wherein the one or more instructions further cause the device to:

add the user identity data associated with the compromised endpoint device to a blacklist; and provide the blacklist to the network devices and the other endpoint devices.

18. The non-transitory computer-readable medium of claim 16, wherein the one or more instructions further cause the device to:

modify security rules associated with the network devices and intrusion prevention system rules associated with the network based on the security policy;

provide the security rules to the network devices; and provide the intrusion prevention system rules to an intrusion prevention system.

19. The non-transitory computer-readable medium of claim 16, wherein the one or more instructions further cause the device to:

temporarily add the user identity data, with an expiration date, to a blacklist; and cause the blacklist to be propagated to the network devices, wherein the one or more instructions further cause the device to prevent traffic of the network from being provided to the compromised endpoint device.

20. The non-transitory computer-readable medium of claim 16, wherein the one or more instructions further cause the device to:

temporarily add the user identity data, with an expiration date, to a blacklist; and cause the blacklist to be propagated to the other endpoint devices, wherein the one or more instructions further cause the device to prevent traffic associated with the compromised endpoint device from reaching the other endpoint devices.

* * * * *